United States Patent [19]

Linville

[11] 4,413,376
[45] Nov. 8, 1983

[54] SUPPORT SHACKLE AND PRODUCT DROP MECHANISM

[76] Inventor: Richard D. Linville, P.O. Box 7, Pleasant Valley, Iowa 52767

[21] Appl. No.: 424,322

[22] Filed: Sep. 27, 1982

Related U.S. Application Data

[63] Continuation of Ser. No. 227,140, Jan. 21, 1981, Pat. No. 4,372,009.

[51] Int. Cl.³ .............................................. A22C 21/00
[52] U.S. Cl. ..................................................... 17/44.1
[58] Field of Search .......................... 17/44, 44.2, 44.1

[56] References Cited

U.S. PATENT DOCUMENTS

| 2,830,319 | 4/1958 | Muntz | 17/44.1 UX |
| 3,166,785 | 1/1965 | Lemmond | 17/44.1 |
| 3,781,946 | 1/1974 | Altenpohl | 17/44.1 |

FOREIGN PATENT DOCUMENTS 7811349  5/1980  Netherlands ........................ 17/44.2

Primary Examiner—Willie G. Abercrombie
Attorney, Agent, or Firm—Edmond T. Patnaude

[57] ABSTRACT

A product carried by a rigid support device swingably suspended from an overhead conveyor is dropped from the support device by a striker mechanism which sharply strikes the support device to cause it to swing out from under the product.

5 Claims, 7 Drawing Figures

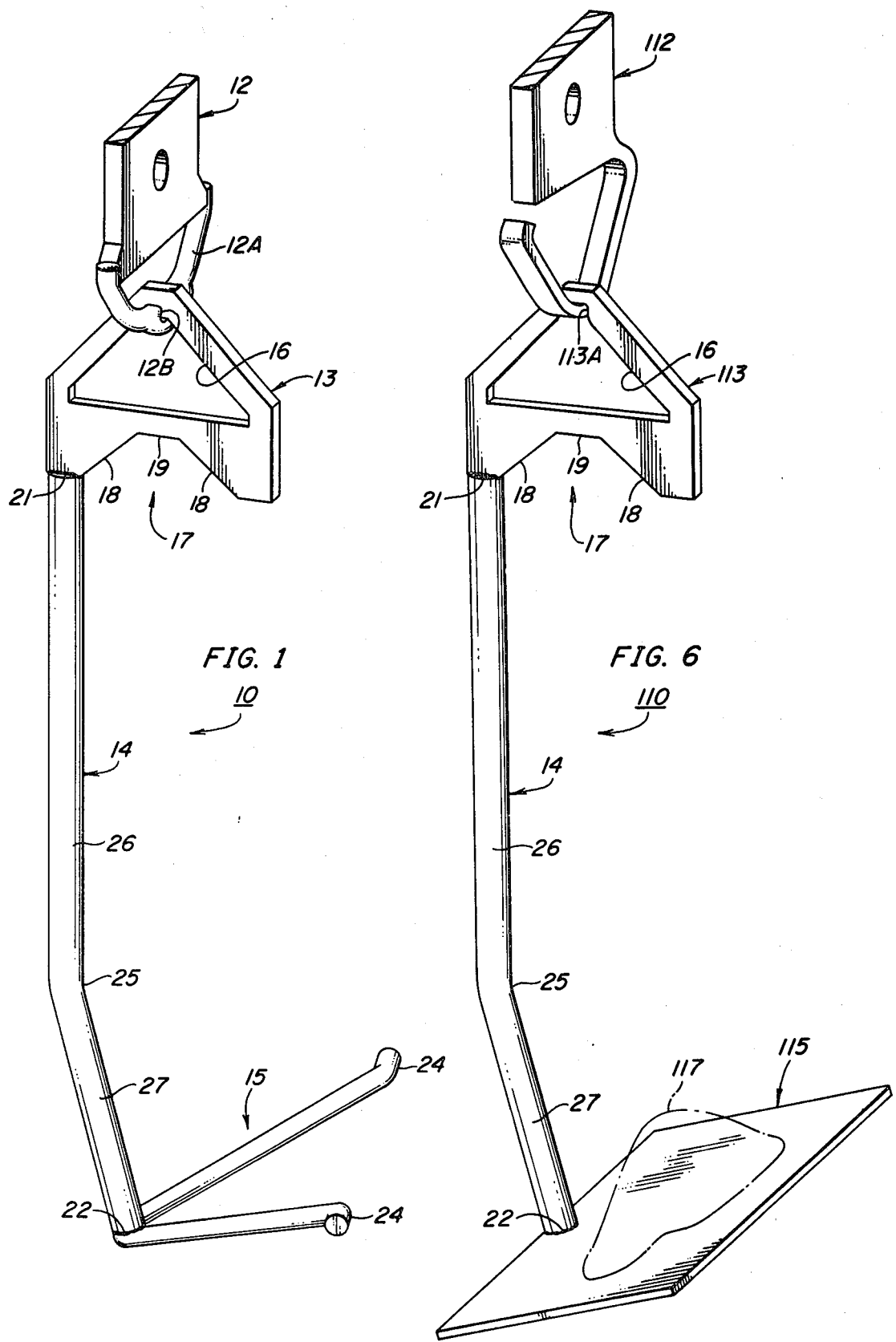

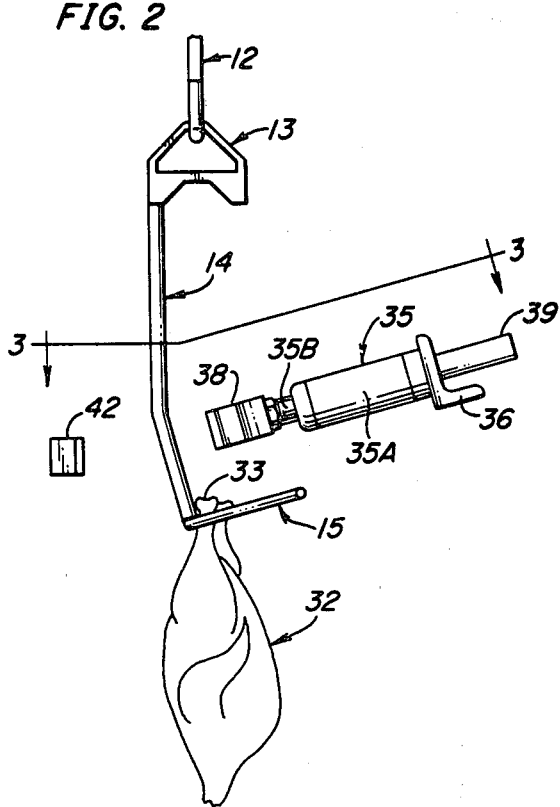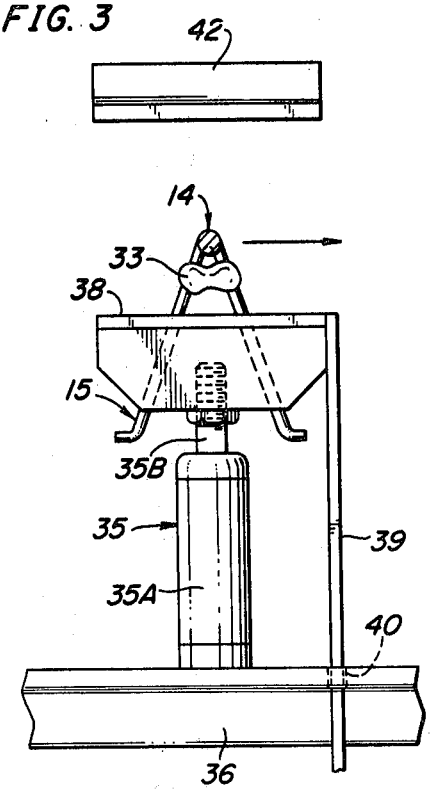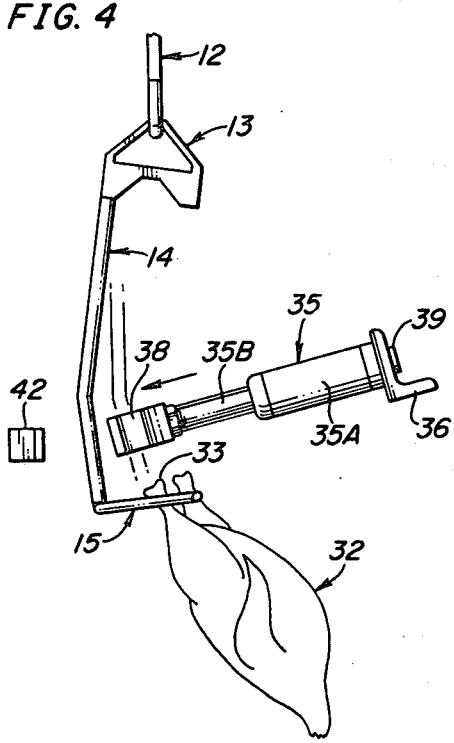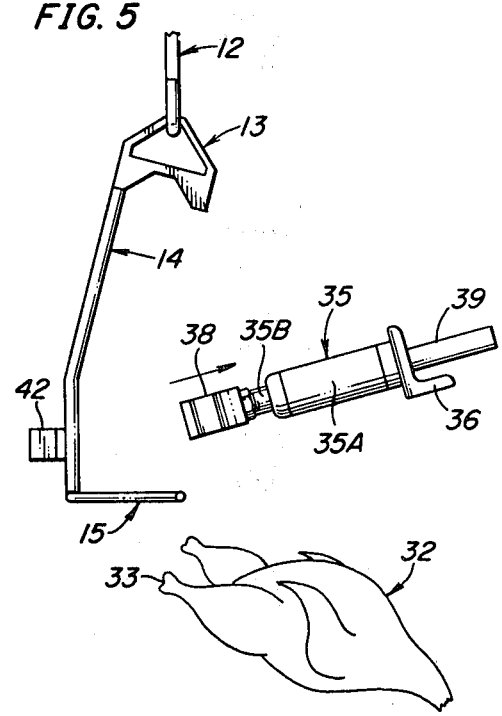

SUPPORT SHACKLE AND PRODUCT DROP MECHANISM

This is a continuation of application Ser. No. 06/227,140, filed Jan. 21, 1981, now U.S. Pat. No. 4,372,009.

The present invention relates in general to a means for suspending poultry from a conveyor line and relates in particular to a new and improved method for shackling poultry to a processing conveyor line from which the finished product is automatically released.

BACKGROUND OF THE INVENTION

Processing of poultry such as chickens, turkeys and the like is generally carried out on an assembly line basis. The birds are suspended from overhead conveyors and routed to various processing operations throughout the plant. As the finished product reaches the end of the line it is removed from the conveyor and packaged for shipment.

In the prior art the product has been suspended from the overhead conveyors by specially designed shackles. It is the design of these shackles, that allows the finished product to be released from the conveyor line. However, the various types of shackle configurations have presented the industry with certain problems.

One prior art method is the use of a shackle with a locking mechanism which when released allows the product to fall freely. This type of shackle, due to the number of moving parts, is costly and requires maintenance and thus additional cost.

A second prior art method is one in which the product is suspended by a shackle which requires the product to be struck or pushed to remove it. This method results in damage to the product.

The present invention provides an inexpensive shackle of one piece construction and associated release mechanism, which allows the finished product to be automatically removed without striking or pushing against the product.

Briefly, in accordance with the teachings of the present invention there is provided a novel product support shackle and an associated drop mechanism which is mounted along the path of travel of the shackle and which sharply strikes the shackle to cause it to swing out from beneath the product being carried thereby.

GENERAL DESCRIPTION OF THE DRAWINGS

A better understanding of the invention can be had by a reading of the following detailed description taken in connection with the accompanying drawings wherein:

FIG. 1 is a perspective view of a shackle embodying the present invention and in particular showing the means by which it is suspended from a conveyor and the fork which holds the product;

FIG. 2 is a side view of the shackle in FIG. 1 and shows in particular the location of the dropping mechanism relative to the shackle;

FIG. 3 is a top view taken in section along line 3—3 in FIG. 2 and showing in particular the location of the drop striker and the shackle;

FIG. 4 is a view similar to that of FIG. 2 but showing the drop striker just after it has impacted the shackle so as to dislodge the product at the specified spot;

FIG. 5 is a schematic representation showing the shackle being cushioned after the product has been released; and FIG. 6 is a perspective view of a shackle utilizing a plate on which the product rests.

DETAILED DESCRIPTION OF THE DRAWINGS

Referring to FIG. 1 a shackle 10 is adapted to be suspended from an overhead conveyor by a pendant 12 (only partially shown) for the purpose of carrying poultry products throughout a processing operation. The shackle 10 is a solid, unitary article of three piece construction comprising a shackle suspension member 13, a rigid bar 14 and a product support 15. These three parts are rigidly connected together and when formed of metal they are welded together.

The shackle suspension member 13 is in the form of a flat plate and has a generally triangular opening 16 through which a generally U-shaped arm 12A of the pendant 12 extends to support the shackle and permit it to swing freely on the pendant 12. The arm 12A has a central notch 12B at the bottom which receives the member and prevents it from twisting relative to the pendant. The sides of the notch 12A diverge toward the bottom to permit the member 13 and the shackle 10 swing relative to the pendant while the upper narrow mouth of the notch 12A fits closely to the sides of the member 13 to prevent twisting of the shackle.

A recess 17 in the bottom of the shackle suspension member has tapered side walls 18 and a bottom wall 19. During a weighing process as described in copending application Ser. No. 227,142 filed Jan. 21, 1981, the shackle 10 carrying the product is supported from the bottom of the shackle suspension member 13 and lifted to free the shackle 10 from the conveyor pendant 12 as the product is carried across a weighing platform.

Considered in greater detail, weld 21 fixedly attaches a rigid bar 14 to the shackle suspension member 13, and likewise, a weld 22 fixedly attaches the rigid bar to the product support 15, which in this particular embodiment is shown as a bifurcated fork.

The product support 15 as shown has ends 24 extended outwardly to provide a large opening which facilitates placing of the knuckle of a bird into the fork.

A bend 25 in the rigid bar 14 divides it into a straight upper portion 26 and a straight lower portion 27. As the shackle 10 hangs from the pendant 12 the fork 15 extends in an upward direction to accept the knuckle of the product and hold it in place as the bird is carried along the processing line. The bend 25 is formed in the rigid bar 14 so that the product hangs directly below the pendant 12.

Referring to FIG. 2, a poultry carcass 32 is hung by a knuckle 33 in the fork 15 of a shackle 10. Mounted along the conveyor at a location where it is desired to selectively drop the product from the shackles, a drop mechanism 35 is mounted for sharply striking or impacting the lower portion 27 of the rigid bar 14 in a direction substantial parallel to the plane of the fork 15. The abrupt movement of the fork 15 causes it to slip freely under the knuckle of the bird 32 whereby it is released and drops to a suitable receptacle without damage to the bird.

Considered in greater detail, the drop mechanism comprises a pneumatically operated piston-cylinder assembly having a cylinder 35A suitably mounted as by an arm 36 at the desired location along the path of travel of the shackles. A piston arm 35B carries a striker element 38 which, as best shown in FIG. 3, is elongated in the direction of travel of the shackle as shown by the arrow. A guide bar 39 is carried by the striker element 38 and slidably extends through a hole 40 in the support arm 36 to hold the element in a horizontal position.

A cushioning element 42 is suitably mounted opposite the striker element 38 for restricting the swinging movement of the shackle after it has swung past the product release position as shown in FIG. 5. Excessive swinging and possible entanglement of the shackles with one another or with the overhead conveyor is thereby prevented.

Referring to FIG. 6, there is shown another embodiment of the present invention in the form of a shackle 110 and a conveyor pendant 112. The pendant 112 has a V-shaped support arm 112A which is in the form of an open hook to permit insertion of the arm 112A through the triangular opening 16 in the support plate 113. The product support device 115 differs from the fork 15 in that the product support device 115 is in the form of a flat plate lying in a direction perpendicular to the longitudinal axis of the lower portion 27 of the bar 14. A product, shown, in phantom, at 117, is adapted to be carried on the plate 113 and to be dropped when the bar 14 is struck by the striker element 38 as described above in connection with FIGS. 2-5. The product 117 may, for example, be an individual serving portion of poultry or other product.

In this embodiment of the invention the shackle support plate 113 has a notch 113A which receives the support arm of the pendant 112 to prevent the shackle from twisting relative to the pendant when the shackle is impacted by the impactor element 38. The width of the notch 113A is slightly greater than the corresponding dimension of the pendant to permit some limited relative movement in the direction of conveyor travel between the pendant and the shackle support plate.

While the present invention has been described in connection with particular embodiments thereof, it will be understood by those skilled in the art that many changes and modifications which come within the true spirit and scope of this invention.

What is claimed is:

1. A shackle for hanging a product from a pendant depending from an overhead conveyor, comprising
   hook means adapted to be attached to said pendant for pivotable movement about an axis parallel to the direction of travel of said conveyor,
   an elongated rigid support member depending from said hook means to one side of said axis,
   said support member having product support means disposed at its lower end and extending laterally therefrom directly below said axis for supporting said product with the center of gravity of said shackle and said product disposed directly below said axis and offset from said support member.

2. A shackle according to claim 1 wherein said hook means comprises
   a planar member having an opening therethrough for receiving a portion of said pendant, and
   said planar member having a support surface located directly below said axis, said support surface being adapted to rest on a conveyor chain located directly below said axis and extending parallel thereto.

3. A shackle according to claim 2 wherein
   said planar member is a plate, and
   said support surface is disposed on the bottom edge of said plate.

4. A shackle according to claim 3 wherein
   said support member is a single, elongated bar,
   said bar being affixed to said plate at a location laterally offset from said support surface.

5. A shackle according to claim 4 wherein
   said bar is provided with an intermediate bend which positions said product support means directly below said axis.

* * * * *